US008528043B2

(12) United States Patent
Hu

(10) Patent No.: US 8,528,043 B2
(45) Date of Patent: Sep. 3, 2013

(54) SYSTEMS AND METHODS FOR GENERATING TRUST FEDERATION DATA FROM BPMN CHOREOGRAPHY

(75) Inventor: Ji Hu, Karlsruhe (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/312,298

(22) Filed: Dec. 6, 2011

(65) Prior Publication Data

US 2013/0145419 A1    Jun. 6, 2013

(51) Int. Cl.
| H04L 29/06 | (2006.01) |
| G06F 7/04 | (2006.01) |
| G06F 12/14 | (2006.01) |
| G06F 13/00 | (2006.01) |
| G06F 17/30 | (2006.01) |

(52) U.S. Cl.
USPC .................. 726/1; 726/21; 713/156; 709/205

(58) Field of Classification Search
None
See application file for complete search history.

(56) References Cited

U.S. PATENT DOCUMENTS

| 7,280,977 | B2 * | 10/2007 | Sengir et al. ................. 705/7.27 |
| 8,091,035 | B2 * | 1/2012 | O'Sullivan et al. ............ 715/753 |
| 2003/0055898 | A1 * | 3/2003 | Yeager et al. ................. 709/205 |
| 2003/0236693 | A1 * | 12/2003 | Chen et al. ......................... 705/9 |
| 2006/0069658 | A1 * | 3/2006 | Haller et al. ..................... 705/78 |
| 2006/0259320 | A1 * | 11/2006 | LaSalle et al. ..................... 705/1 |
| 2011/0040965 | A1 * | 2/2011 | Feezel et al. ................... 713/156 |
| 2012/0011587 | A1 * | 1/2012 | Byrne et al. ...................... 726/21 |

OTHER PUBLICATIONS

A. Alves, A. Arkin, S. Askary, Ch. Barreto, B. Bloch and Fr. Curbera et al. "Web services business process execution language version 2.0." http://docs.oasisopen.org/wsbpel/2.0/os/wsbpel-v2.0-os.html, 2007.

S. Bajaj, G. Della-Libera, B. Dixon, M. Dusche, M. Hondo, and M. Hur, "Web services federation language (ws-federation) version 1.0." http://msdn2.microsoft.com/enus/library/ms951236.aspx, 2003.

L. Clement, Q. Hately, K. Riegen, and T. Rogers, "Uddi version 3.0.2", uddi spec technical committee draft. http://www.oasis-open.org/committees/uddi-spec, 2004.

T. Fielding and N. Taylor, "Principled design of the modern web architecture." ACM Transactions on Internet Technology, pp. 115-150, 2002.

OpenID Foundation. Openid. http://openid.net/.

L. Heuser, C. Alsdorf, and D Woods, editors. "International Research Forum 2007", pp. 100-101. Evolved Technologist Press, New York, 2008.

(Continued)

*Primary Examiner* — Shin-Hon Chen
(74) *Attorney, Agent, or Firm* — Fountainhead Law Group PC

(57) ABSTRACT

In practice, collaborative processes using web services present complex information security requirements, as a domain security model needs to conditionally control access to data and services by both internal and external collaboration participants. One embodiment presents an automated process for defining required trust relationships between collaboration participants that can be used for materializing domain IT policies. A BPMN choreography process model of a business process is parsed to extract participant and task lists. An initiating participant is identified for each task in the task list. A trust graph (can be represented in a matrix format) is generated to represent trust relationships implicit in the business process model by indicating in the trust graph that all other participants in a given task are to trust the initiating participant of that task. A registry can be used to gather data used to materialize security policies based on the trust relationships.

20 Claims, 6 Drawing Sheets

(56) References Cited

OTHER PUBLICATIONS

ITU-T. Itu-t recommendation x.509: Information technology—open systems interconnection—the directory: Authentication framework. http://www.itu.int/rec/t-rec-x.509, 2005.

N. Kavantzas, D. Burdett, G. Ritzinger, F. Fletcher, Y. Lafon, and Ch. Barreto, "Web services choreography description language version 1.0", w3c candidate recommendation 9. http://www.w3.org/tr/ws-cdl-10/, 2005.

A. Nadalin, M. Goodner, M. Gudgin, A. Barbir, and H. Granqvist, Ws-trust 1.3 oasis standard. http://docs.oasis-open.org/ws-sx/ws-trust/200512/ws-trust-1.3-os.html, 2007.

A. Nadalin, Ch. Kaler, P. Hallam-Baker,, and Monzillo R. "Web services security v1.1." http://www.oasis-open.org/committees/download.php/16790/wss-v1.1-specos-soapmessagesecurity.pdf, 2004.

B. C. Neuman and T. Ts'0. "Kerberos: An authentication service for computer networks." IEEE Communications, 32 (9):33-38, 1994.

OASIS. Security assertion markup language (saml) v2.0. http://saml.xml.org/saml-specications, 2005.

OMG. Business process modeling notation (bpmn) version 1.2., 2009.

OMG. Business Process Model and Notation (BPMN) Version 2.0 (Beta 2). http://www.omg.org/spec/BPMN/2.0, chapter 11.8 XML Schema for Choreography. OMG, 2010.

OMG. Business process model and notation (bpmn) version 2.0. http://www.omg.org/spec/bpmn/2.0, 2010.

P. Robinson, F. Kerschbaum, and A. Schaad, "From business process choreography to authorization policies." In The 20th Annual IFIP WG 11.3 Working Conference on Data and Applications Security, pp. 297-309. Springer, 2006.

A. S Vedamuthu, D. Orchard, F. Hirsch, M. Hondo, P. Yendluri, T. Boubez, and Ü. Yalcinalp, "Web services policy 1.5—framework.". http://www.w3.org/tr/ws-policy/, 2007.

W3C. Document object model (dom) level 3 core specification. http://www.w3.org/tr/2004/rec-dom-level-3-core-20040407/, 2004.

Christian Wolter, Michael Menzel, Christooph Meinel, "Modelling Security Goals in Business Processes," Computer and Information Science, vol. 127, 2008. pp. 197-212.

\* cited by examiner

|  | Car Maker | Seat Maker | Spec Engineering | Eco Consult |
|---|---|---|---|---|
| Car Maker | FALSE | TRUE | FALSE | FALSE |
| Seat Maker | TRUE | FALSE | TRUE | FALSE |
| Spec Engineering | FALSE | TRUE | FALSE | TRUE |
| Eco Consult | FALSE | FALSE | TRUE | FALSE |

SYSTEMS AND METHODS FOR GENERATING TRUST FEDERATION DATA FROM BPMN CHOREOGRAPHY

BACKGROUND

The present invention relates to collaborative business enterprises, and in particular, to web services approaches to collaborative business processes.

Information security professionals often work for a particular company and seek to maintain security of information and computation resources, while helping, or at least not unduly obstructing, the needs of business personnel to access information, share information with appropriate personnel, and collaborate with other personnel, both within a given company and with personnel from other companies.

Security within a given domain can use security policy frameworks to systemize an approach to security for that domain. From the basic concept of security frameworks, and policy based security enforcement, a variety of developments have been made. Examples of such developments and efforts include the following.

SAML is an OASIS standard which allows enterprises to establish trust relationships with their business partners or customers. It is used for exchanging authentication and authorization data between different security domains. In SAML, an identity provider offers users authentication service and issues them SAML assertions (tokens) which are trusted and can be verified by service providers. SAML defines security as assertions, a set of protocols for integrating assertions in service requests and responses as well as bindings which encapsulate SAML messages into HTTP or SOAP messages. Main applications of SAML are web single sign-on and federated identity in B2C and B2B scenarios.

In some security frameworks such as WS-Security and WS-Federation, trust policies can be expressed in the format of WS-Policy and deployed to Security Token Services (STS) of participant domains. Trust policies can be also presented as configurations of trust federation technologies such as open SAML or WS-Federation tokens for cross-domain single sign-on.

There are a number of emerging technologies which address implementation aspects of identity federation and authentication brokerage.

WS-Security and WS-Federation. WS-Security is a federated identity specification to encapsulate security within SOAP messages. WS-Security defines attributes which can be added to a SOAP message header for user authentication and message confidentiality and integrity. WS-Security presents authentication information as tokens embedded in SOAP headers and supports tokens like Kerberos tickets, X.509 certificates, and SAML assertions.

WS-Federation extended the WS-Security and Security Token Service (STS) models to support scenarios where resources managed in a security domain can be provided to security principals whose identities and attributes are managed in other domains. WS-Federation is aimed for providing a common infrastructure to perform federated identity operations for web services and browser-based applications.

OpenID is an open, decentralized standard for user authentication, by which users can use a single identity for logging on to different web services. OpenID removes the need that end users have to present their account and password for authenticating to each service because identity providers which issue identifiers to end users are trusted by relying parties, i.e. service providers.

Security requirements can be expressed by annotations provided within a business process definition for expressing security requirements for tasks in a business processes. Security annotations can be later transformed into deployable authorization policies. Web Services Choreography Description Language (WS-CDL) process models also can be compiled into enhanced authorization policies that express a minimal set of authorizations required for business collaboration.

SUMMARY

Embodiments of the present invention include a machine implemented method for generating trust policy rule inputs, comprising accessing data from a tangible machine readable medium representative of a model of a process, the model being in a format of a Business Process Modeling Notation (BPMN) choreography process, identifying, from the model of the process, a set of participating entities, wherein each participating entity is to participate in the process, identifying, from the model of the process, a set of participating entities, wherein each participating entity is to participate in the process, identifying a set of choreography tasks conducted between the participating entities, identifying an initiating entity for each choreography task in the set of choreography tasks, and a corresponding participating entity for that choreography task, and storing data in a tangible computer readable medium indicating a trust relationship between the corresponding entity and the initiating entity, to be materialized by trust policies implemented by respective domains of the corresponding entity and the initiating entity.

In one embodiment, the storing of data indicating that the corresponding entity trusts the initiating entity comprises storing a matrix of binary values, the matrix having a row entry and a column entry for each participating entity in the process, the binary values indicative of a trust relationship or absence of a trust relationship.

In one embodiment, the present invention further comprises initializing the binary values of the matrix to indicate absence of a trust relationship.

In one embodiment, the identifying the set of participating entities and the identifying the set of choreography tasks comprises identifying a choreography task declaration in an XML formatted file representing the model of the process, and then identifying each instance of a participant reference tag and a single initiating participant tag in that choreography task declaration.

In one embodiment, the model of the process is represented by an XML formatted file, and the identifying the set of participating entities comprises parsing the XML formatted file to extract participant identifiers from the XML formatted file.

In one embodiment, the model of the process is represented by an XML formatted file, and the identifying the set of tasks comprises parsing the XML formatted file to extract choreography task identifiers from the XML formatted file.

In one embodiment, the present invention further comprises making a respective instance of a participating entity class, for each identified participating entity, and making a respective instance of a choreography task class, for each identified choreography task.

Embodiments of the present invention include a system for generating trust policy rule inputs, comprising a computation system comprising a processor, and a tangible memory, the processor coupled to read from and write to the tangible memory, wherein the tangible memory stores instructions for performing a method on the computation system comprising accessing data from a tangible machine readable medium representative of a model of a process, the model being in a format of a choreography Business Process Modeling Notation (BPMN), identifying, from the model of the process, a set of participating entities, wherein each participating entity is to participate in the process, identifying a set of choreography tasks conducted between the participating entities, and identifying an initiating entity for each choreography task in the set of choreography tasks, and a corresponding participating entity for that choreography task, and responsively storing data in a tangible computer readable medium indicating a trust relationship between the corresponding entity and the initiating entity, to be materialized by trust policies implemented by respective domains of the corresponding entity and the initiating entity.

In one embodiment, the method performed by the computation system further comprises storing a matrix of binary values, the matrix having a row entry and a column entry for each participating entity in the process, the binary values indicative of a trust relationship or absence of a trust relationship.

In one embodiment, the method to be performed on the computation system further comprises initializing the binary values of the matrix to indicate absence of a trust relationship.

In one embodiment, the method to be performed on the computation system comprises identifying a choreography task declaration in an XML formatted file representing the model of the process, and then identifying each instance of a participant reference tag and a single initiating participant tag in that choreography task declaration.

In one embodiment, the model of the process is represented by an XML formatted file, and the method to be performed on the computation system comprises identifying the set of participating entities by parsing the XML formatted file to extract participant identifiers from the XML formatted file.

In one embodiment, the model of the process is represented by an XML formatted file, and the method to be performed on the computation system comprises the identifying the set of tasks by parsing the XML formatted file to extract choreography task identifiers from the XML formatted file.

In one embodiment, the method to be performed on the computation system further comprises making a respective instance of a participating entity class, for each identified participating entity, and making a respective instance of a choreography task class, for each identified choreography task.

Embodiments of the present invention include a tangible machine readable memory storing instructions for causing a machine to perform a method comprising accessing data from a tangible machine readable medium representative of a model of a process, the model being in a format of a choreography Business Process Modeling Notation (BPMN), identifying, from the model of the process, a set of participating entities, wherein each participating entity is to participate in the process, identifying a set of choreography tasks conducted between the participating entities, and identifying an initiating entity for each choreography task in the set of choreography tasks, and a corresponding participating entity for that choreography task, and responsively storing data in a tangible computer readable medium indicating a trust relationship between the corresponding entity and the initiating entity, to be materialized by trust policies implemented by respective domains of the corresponding entity and the initiating entity.

In one embodiment, the instructions for storing of data indicating that the corresponding entity trusts the initiating entity comprise instructions storing a matrix of binary values, the matrix having a row entry and a column entry for each participating entity in the process, the binary values indicative of a trust relationship or absence of a trust relationship.

In one embodiment, the instructions further comprise instructions for initializing the binary values of the matrix to indicate absence of a trust relationship.

In one embodiment, the instructions for identifying the set of participating entities and the identifying the set of choreography tasks comprise instructions for identifying a choreography task declaration in an XML formatted file representing the model of the process, and instructions for identifying each instance of a participant reference tag and a single initiating participant tag in that choreography task declaration.

In one embodiment, the model of the process is represented by an XML formatted file, and the instructions for identifying the set of participating entities comprise instructions for parsing the XML formatted file to extract participant identifiers from the XML formatted file.

In one embodiment, the model of the process is represented by an XML formatted file, and the instructions for identifying the set of tasks comprise instructions for parsing the XML formatted file to extract choreography task identifiers from the XML formatted file.

The following detailed description and accompanying drawings provide a better understanding of the nature and advantages of the present invention.

DETAILED DESCRIPTION

Figure 1:
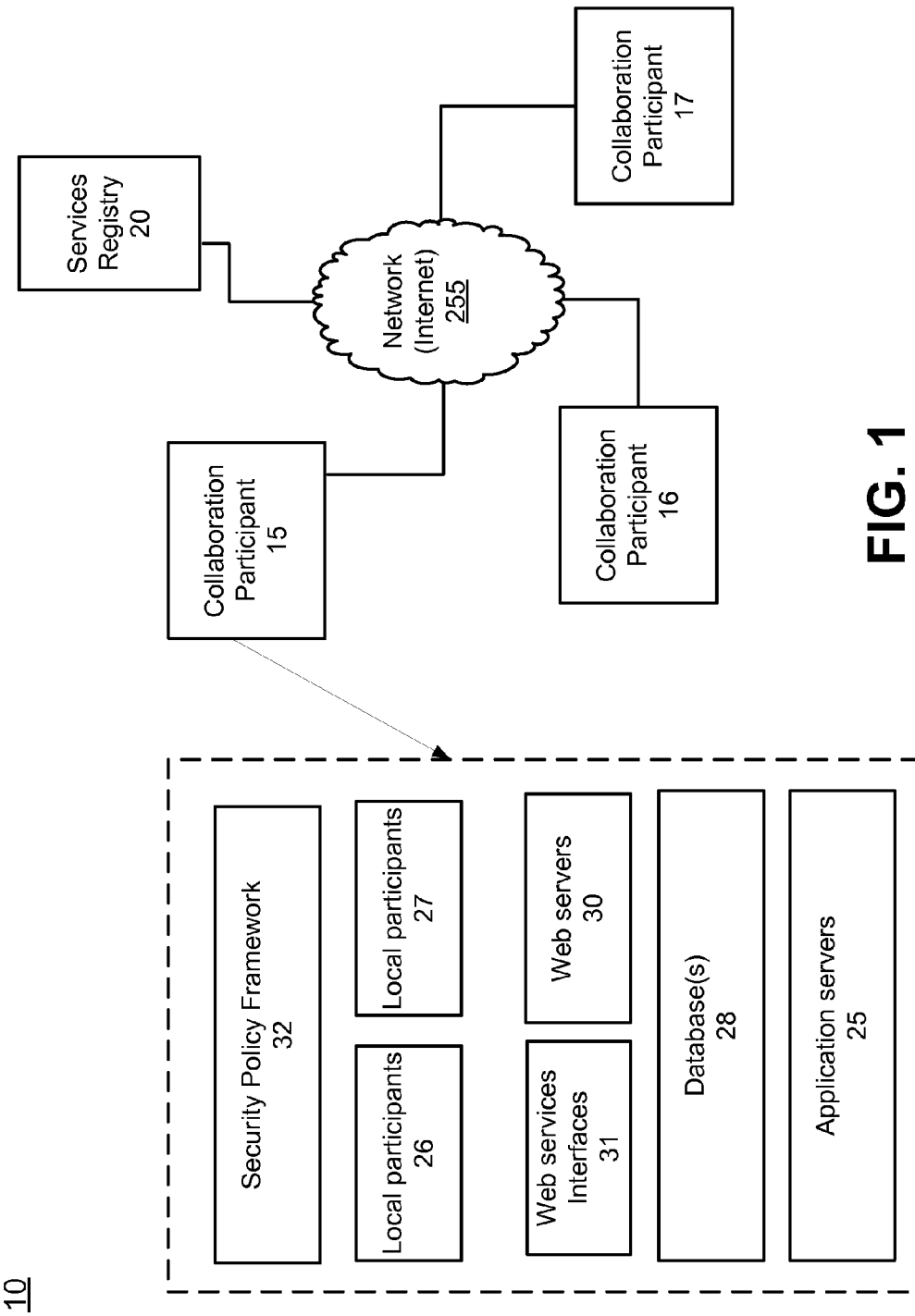
FIG. 1 illustrates an example situation in which multiple participants may collaborate using web services.

Described herein are techniques for producing trust models and relationships from high level business process models. These techniques can be used to express domain-level trust relationships required in order to implement business processes, and to generate inputs to automate creation of domain-specific policy deployments that materialize the expressed trust relationships.

Such business processes can be implemented by use of service oriented architectures, where machines use services provided by other machines in order to accomplish a process. Such collective action also can be viewed as a federated process, in which multiple independent actors collectively provide a solution, service, or product. As such, techniques disclosed herein find use in situations where a business operates in an ecosystem in which system resources, computation domains, services, databases, and other information need to be shared with a variety of personnel that do not belong to or are otherwise controlled by that business.

As introduced, a variety of efforts are being made to provide infrastructure that can enforce security policies. A great deal of focus remains on access control, under assumptions that user identities are already established, which implies that the basic predicate of a trust model also has been established. However, getting to that point remains challenging in a predictable, cost effective, and maintainable manner presents challenges. One approach is to materializing trust policy information inputs from a business process model.

The following disclosure addresses approaches to generating inputs to aid in setting up participant trust models that reflect a given business process. As such, this disclosure addresses providing inputs that can be used to materialize policies that can be deployed within a given security infrastructure.

For example, the disclosure relates to service-based business process execution between or among enterprises, suppliers or customers beyond organizational boundaries. Such service oriented process execution provides a service ecosystem where business services are offered, discovered, traded, aggregated, and consumed via the Internet so that agile, dynamic collaboration and composite services from various providers are made available.

Technically, service-oriented architecture (SOA) enables services implemented and operated on heterogeneous platforms interoperable via common communication interfaces such as Web Services or RESTful Services. By providing business functions as web services, business services become more available and reusable in implementing collaborative business processes and value-added services.

Business processes can be developed by a model driven approach. Business process models allow agile software development techniques to be used in modeling business processes and to then translate model definitions into executable implementations.

In this disclosure, participants in a collaborative business include multiple business roles or entities who agree to join the collaboration and share service resources with each other during business process execution.

FIG. 1 depicts an example collaborative situation in which multiple collaboration participants 15-17 (three participants depicted as being representative of an arbitrary number). Each participant has electronic infrastructure that can communicate within a respective networking domain of the participant, and some of the components are available to be accessed through a wide area network, such as Internet 255. A services registry 20 allows entities that offer web services to register by providing registration information. Authentication data can be provided or created, so that services registry 20 can function as a trusted third party to allow authenticated of registered entities by interested parties. Services registry 20 also can provide descriptions of services available from each entity.

FIG. 1 also depicts an example of infrastructure that can be available within a given domain of a participant. Such infrastructure can include database(s) 25, devices 26-27 used by local participants to access services and information, web servers 30 that may serve resources both externally and internally. A schema for web services interfaces 31 can be provided which can draw upon databases 25, code deployed on web servers 30, and application servers 28 in order to provide services that can be accessed internally, and with appropriate authorization, externally. As such, service resources of a participant can be hosted internally and thus fairly directly controlled by internal Information Technology (IT) personnel and security personnel. For internal participants or users (e.g., local participants 26-27), authenticating and authorizing them to be participants in a given process is a relatively straight-forward matter of using the internal security infrastructure resources to apply appropriate access policies to existing user identities. However, to support interoperability of business collaboration, each participant must agree to grant partners proper rights to access necessary services, which may expose confidential or proprietary information, or be valuable, and hence should be restricted. As such, before participants can share resources in a collaboration, two security requirements should be met by domain security infrastructure.

One requirement is a capacity to handle user identities across enterprise domains, meaning that one enterprise domain can authenticate not only domain users but also users from partner domains before resources and services can be shared. This requirement can be called federated identities or trust federation. Another requirement is that appropriate access rights for cross-enterprise collaborations can be managed, meaning that an enterprise domain can define and maintain access rights of domain resources and services, not only for local domain users but also for external participants involved in collaborative activities.

An enterprise may be reluctant to join business collaboration unless information security can be maintained reliability, at reasonable cost, and at reasonable complexity. However, identity management in a collaborative environment is a challenging and complex task.

One challenge of identity management is to maintain consistency and completeness, especially as more and more demands are placed on infrastructure and personnel to support more collaborations, to end of life those that are completed, and to initiate new ones. One source of inconsistency is that security management is an autonomous task and generally conducted and managed by each participant independently of the other participants. Each participant of collaboration has to understand its own business needs, analyze security requirements, define and enforce corresponding policies. As participants often focus on their local security administration, overall security configuration of an entire collaborative situation may lose consistency. Incorrect security design of one participant may damage global security of the collaboration.

Another challenge is inefficiency. Security configuration for business collaboration heavily relies on manual efforts to integrate external identities into domain security configuration. It is a non-trivial effort to configure, test, maintain, and troubleshoot security of a complex business collaboration environment. Such efforts must be repeated for different collaborations. Moreover, to support dynamic collaboration, security configuration must adapt itself to changing business demands, e.g. resource sharing may be enabled on demand and stopped after business finishes and a participant of collaboration may be replaced during business process execution. On demand collaboration is hindered by lead times associated with setting up an appropriate security infrastructure.

In some aspects, supporting technology for secure and trustworthy collaborative business processes is disclosed. In some aspects methods and processes automate trust management of business collaborations. In one example solution, trust relationships between participants in a business collaboration are established and used to generate accurate and consistent trust policies that can be effectively enforced for process execution.

An overview of an example solution includes the following activities, described further below. A business collaboration is modeled as a choreography business process document using Business Process Model and Notation (BPMN). A semantic model of the resulting choreography process is parsed and analyzed. Trust federation or trust relationships implied in the business process model are derived. Specific trust-related policies are generated from the derived trust relationships (trust federation) identified as being present in the business model. These policies are materialized as deployable trust policies based on information retrieved from a service registry. Deployable trust policies can be expressed in various forms as appropriate for particular web service security frameworks and enforced in participating domains.

Business Process Modeling Notation (BPMN) can be used to formally model business collaboration. BPMN provides a notation which makes process description understandable to business analysts, software architect, technical developers, as well as general business people. BPMN is a based on flow-charting and involves defining diagrams to model business operations using visual components and flow controls. BPMN can be used to model both private business processes and public processes of business collaboration. A second generation BPMN (BPMN2) enhanced the notation with exchangeable format to support multiple modeling tools, BPMN choreography modeling, and formalization of execution semantics, etc.

BPMN2 supports three basic types of process models: Orchestration Processes, Collaboration Processes, and Choreography Processes. Orchestration models represent an organization's view of the process. An orchestration process describes a sequence or flow of activities in an organization to achieve a business objective. A process is depicted by BPMN as a graph of Flow Elements consisting of Activities, Events, Gateways, and Sequence Flows that define finite execution semantics. Choreography models define expected behavior between interacting participants. In BPMN, a choreography consists of a sequence of interactions and message exchanges between participants. Collaboration models depict the interactions between two or more business entities. A collaboration generally contains two or more entities depicted by pools and message flow between them.

Collaborative business processes are modeled here using choreography. Similar to an orchestration process, a choreography consists of sequence flows and flow objectives like activities, events, gateways and shares some elements with orchestration diagrams. Unlike orchestration processes or collaboration processes, a choreography focuses more on interactions. BPMN elements used to model a business choreography process are listed below.

Sequence Flow to show the sequence of choreography activities and connect with other flow objects such as events, gateways, and choreography activities.

A choreography activity represents an interaction between two or more participants in order to perform work. A choreography activity is an abstract object which may be a choreography sub-process, a call choreography activity, and a choreography task. A sub-choreography is a compound activity containing a flow of other activities (i.e. a choreography). A call choreography is a place holder to include a global choreography or global choreography task it is calling. A choreography task is an atomic activity which represents a set of message exchanges between two or more participants. The message sent by either one or both of the participants of the choreography task can be displayed using message icons.

Events specify something that happens during the course of a choreography. Events can affect the flow of the model and usually have a course or an impact. There are three basic events: Start Events and End Events for marking start and end of a choreography, and Intermediate Events occur between a start event and an end event.

Gateways are used to create alternative and/or parallel paths for a choreography. BPMN supports for a choreography the Exclusive, Event-based, Inclusive, Parallel, and Complex gateways.

Figure 2:
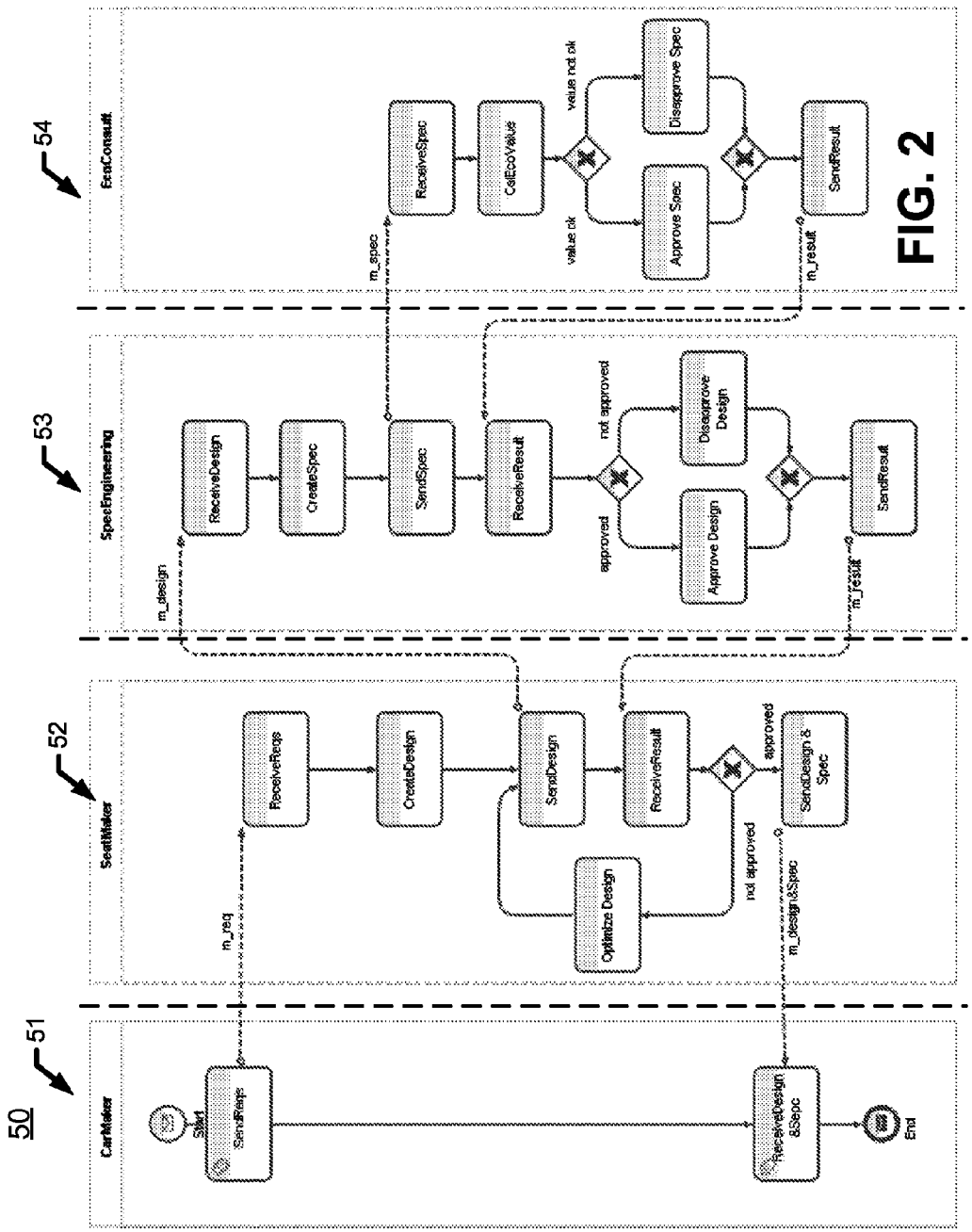
FIG. 2 depicts an example multilane business process diagram of a business serving as an example process in this description.

FIG. 2 presents an example of BPMN2 diagrams and meta-model of a choreography for a particular business collaboration process. The depicted example describes a collaborative car seat design process, involving a car maker 51, a seat maker 52, an engineering firm 53, and an ecoconsultant 54. Ecoconsultant 54 provides a certified calculation web service for eco-calculation, in order to demonstrate or certify compliance with various government mandates, such as mandates imposed by different regulatory regimes as a condition for selling a vehicle in an area controlled by that regime. To avoid obscuring salient topics in this disclosure, details of the process are not exhaustively described herein.

Continuing with the example, in the automotive industry, car maker 51 relies on component suppliers to provide car parts. Car seat design is outsourced to car seat manufacturer 52. Each particular country where a car may be shipped may have a different regulatory regime, with various arbitrary mandates, which may in some cases conflict with one another, or be more or less onerous relating to one subject or another. For example, car seats mounted in models for Australian markets must meet Australian eco-directives.

In this example, seat manufacturer 52 does not possess expertise in eco-assessment, and, therefore, has to rely on engineering partner 53 for material analysis. In order to certify compliance with the eco-directives, engineering partner 53 in turn uses ecoconsultant 54 for calculating eco-value of car seats according to rules of particular markets or regulatory regimes. For example, one regime may require "at least 85% materials must be recyclable" or "Carbon footprint for making a seat must be less than 5 kg". If the design complies with all regulations, the car marker will receive an eco-compliance certificate. Otherwise, the seat design process has to be repeated until the final result is accepted.

As such, there are four business entities involved in the depicted seat design process, each with defined roles, and information transfer requirements: car maker 51 establishes and promulgates requirements for seat manufacturing; seat manufacturer 52 creates a seat design and supplies seats to car maker 51; engineering company 53 generate technical specifications of the design delivered by seat manufacturer 52; and eco-consulting company 54 provides a certified eco-calculation service.

Figure 3:
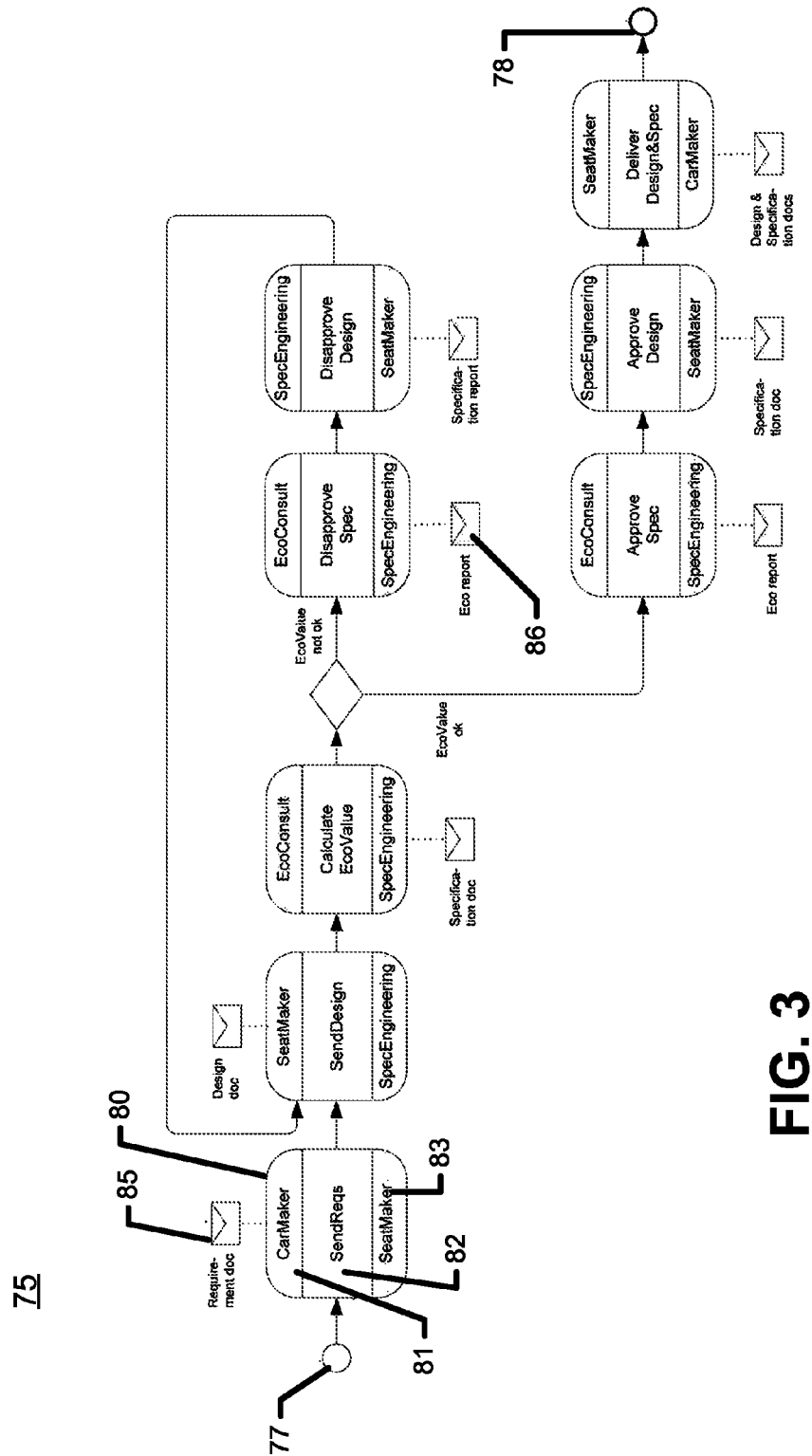
FIG. 3 depicts a BPMN choreography model of the process of FIG. 2.

The seat design process of FIG. 2 can be re-modeled using the BPMN choreography depicted in FIG. 3. As the choreography model only focuses on interaction and messaging between participants, internal steps of the participant are eliminated for simplicity. A choreography diagram consists of flow objects. The diagram in FIG. 3 includes (in part) a start event 77 and an end event 78. The diagram also includes tasks represented by rounded rectangles. These tasks are Choreography Tasks and represent interactions (choreography task 80 identified). A choreography task has three bands representing the task name and the names of two interacting participants. With respect to choreography task 80, an initiator participant 81 is carmaker 51. The initiator participant initiates an interaction. A choreography task is identified in a middle of rectangle 80, and is sendreqs 82. A recipient of the task, represented by a requirements document 85 is identified as seatmaker 83.

Reports or other information also can be returned, which are responsive to a task initiated by an initiating entity. An example of a return report is ecoreport 86, which is generated by ecoconsultant 54, and returned to engineering firm 53, which initiated the interaction that caused ecoconsultant 54 to generate the report 86. The remaining tasks can be understood similarly, and need not be separately addressed. The BPMN2 choreography process model thus includes information about an initiator and a recipient of each task, information about a message being sent from initiator to recipient, as well as whether information is returned to the initiator.

To support secure and trustworthy collaborative business processes, a set of methods and processes to automate trust management of business collaborations is provided, focusing on establishment of trust relationships between participants in a business collaboration and generating accurate and consistent trust policies which can be effectively enforced for process execution. At a high level, a business collaboration is formally modeled as a choreography business process document using Business Process Modeling Notation (BPMN). A semantic model of the choreography process is parsed and analyzed. Trust federation or trust relationships implied in the business process model are derived.

Specific trust-related policies are generated from the derived trust federation and materialized as deployable trust policies based on information retrieved from a service registry. Deployable trust policies can be expressed in various forms for corresponding web service security frameworks and enforced in participating domains.

BPMN2 includes a schema for interchange of machine readable XML documents of process models. This schema defines semantic models and diagram models separately. The semantic models define business entities and processes in a business perspective and the diagram models describe graphic elements corresponding to elements of the semantic models for visual representing those semantic elements. This disclosure primarily focuses on semantic models from which trust relationships can be captured. The Appendix represents a simplified BPMN semantic model translated from the diagram in FIG. 3.

Figure 4:
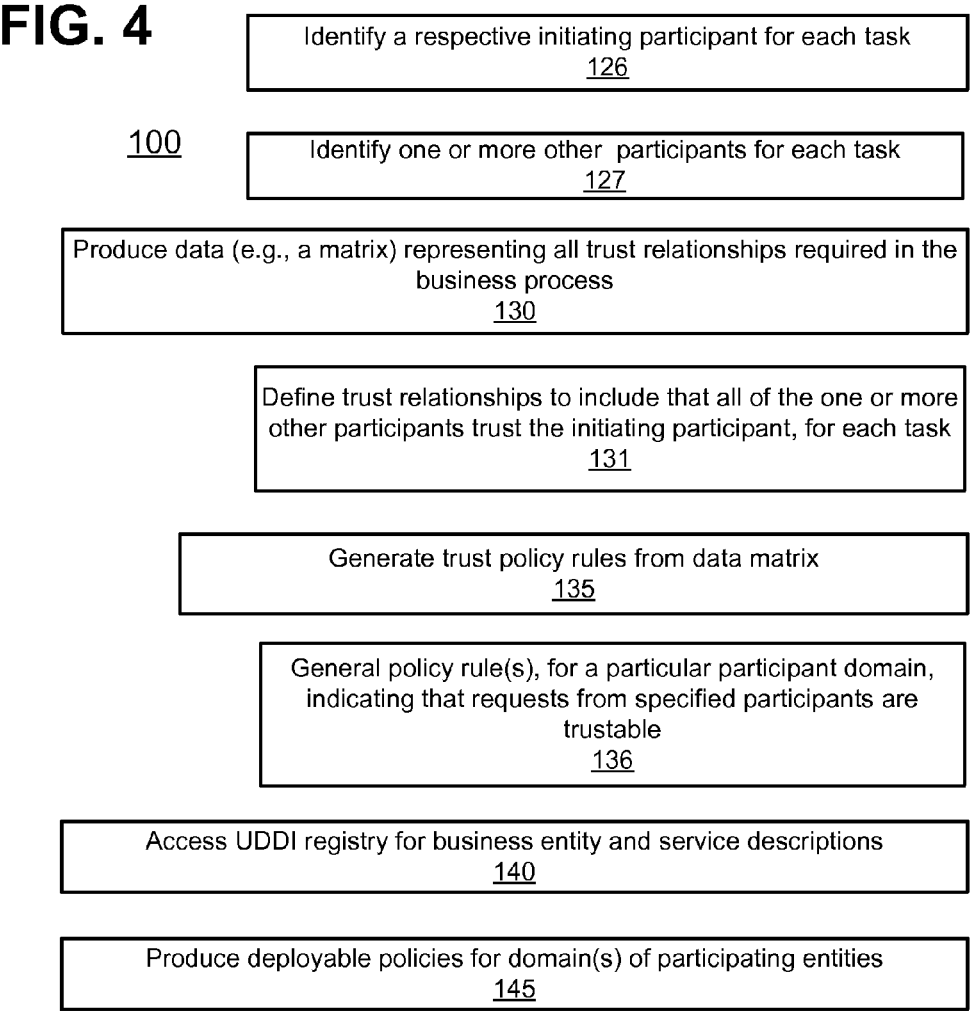
FIG. 4 depicts an example method for generating trust model information from the choreography model of FIG. 3.

FIG. 4 depicts an example process 100 by which the choreography process can be used as a basis for generating specified trust relationships implied or required to implement the depicted business process. Derivation of the trust graph has two phases: the preparation phase and derivation phase. According to example process 100, at 110, data describing a BPMN choreography process model (e.g., in XML format) is received and at 120, the data is parsed and analyzed. Where the process model is in a plain text document compliant with the BPMN schema, XML parsing programs, e.g. parsers to support the XML Document Object Model (DOM), a W3C specification for accessing structured documents can be used to parse the model.

During parsing 120, at 121, a list of business participants is produced and at 122, a list of choreography tasks discovered in the choreography process model is produced. A participant can be represented as an instance of a Participant type or class in object oriented languages. For example, a participant class can be defined as

```
Class Participant {
    id;
    name;
}.
```

The participant list is represented by an array participants [1 ... n] in type of Class Participant, where n is the number of participants occurring in the choreography process model.

A choreography task can be represented as an instance of a Task type:

```
Class Task {
    id;
    name;
    Participant participants[ ];
    Participant initialParticipant;
}.
```

A choreography task includes a list of participates involved in the task and figures out the initial participant. It could be possible that more than two participants are included in a task, such as compound activities, whereas only one initial participant is allowed.

Thus, process 100 further defines, at 125, a set of participants for each task in the list of tasks. Defining respective sets of participants includes identifying (126) an initiating participant for each task and identifying (127) one or more other participants for each task. A choreography task has one initiating participant, but can have any number of participants.

Pseudocode to perform operations 120-127 of process 100 is shown below. The participant list can be populated by searching for the <participant> tags in the DOM document and retrieving id and name attributes. The choreography task list can be determined by searching for the <choreographyTask> tags. In addition to retrieving name and id attributes, the initiating participant and the participant list are also extracted by corresponding tag names.

```
Participant participants[ ];
i = 0;
for each < participant> node p ∈ D {
    participants[i].id = p.getAttribute("id");
    participants[i].name = p.getAttribute("name");
    i = i + 1;
}
j = 0;
Task tasks[ ];
for each < choreographTask > node t ∈ D {
    tasks[j].id = t.getAttribute("id");
    tasks[j].name = t.getAttribute("name");
    tasks[j].initiatingParticipant =
        t.getElementByTagName("initiatingParticipantRef");
    k = 0;
    for each < participantRef > node pr ∈ t {
        tasks[j].participants[k] =
            t.getElementsByTagName("participantRef");
        k = k + 1;
    }
    j = j + 1;
}
```

In this disclosure, trust relationships of a BPMN choreography process can be represented as a trust graph: G=(P, R), where, P denotes a set of business entities which agree to participate in collaboration. P can be represented as a list of vertices equal (or greater) than a number of business entities in the choreography process. In many common usages, P will be equal to a number of business roles in the process, where there is a 1:1 correspondence between business entities and roles. However, if one business entity has more than one role, then there may be more roles than business entities. Depending on the circumstances, these different roles may be treated separately or the same, with respect to the set of trust relationships that are developed. For simplicity, a 1:1 correspondence of business entities and roles is assumed here. R is a set of trust relationships (trustworthiness) between participants. In this notation, trust relationships are represented as directed edges in G.

Figures 5, 6:
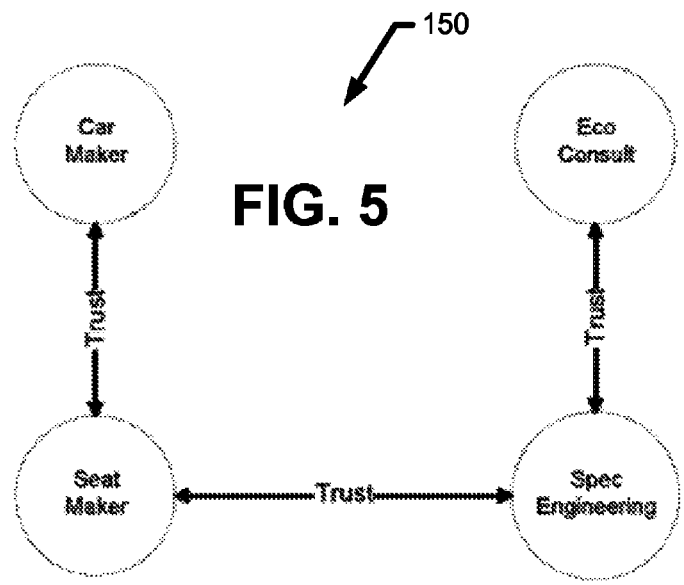
FIG. 5 depicts a trust graph generated from a portion of the process of FIG. 4.
FIG. 6 depicts a matrix representation of the trust graph of FIG. 5.

FIG. 5 shows a trust graph 150 for the choreography process model depicted in FIG. 3. In trust graph 150, trust is modeled as directed relationships among participants, derived from trust relationships implicit in the process. The direction of trust is decided by the direction of messaging. For instance, specifying that car maker 51 initializes a message to seat maker 52 in the process means that the message recipient (seat maker 52) should be able to verify messages from car maker 51 so the message sender should be a trusted party of the recipient. The trustworthiness of a message can be validated by signatures or assertions attached by the sender. However, seat maker 52 is not automatically trusted by car maker 51 if there is no returning message from the seat maker.

Trust graph 150 can be represented as an n×n matrix (where n=|P|), as shown in FIG. 6 with matrix 152. Matrix representation is a computer-friendly form for storing and processing directed graphs. From these inputs, matrix 152, representing trust graph 150 is built up based on the input of the participant and task lists. Pseudocode below shows how the trust graph can be determined.

In the beginning of the algorithm represented by the pseudocode, a matrix is initialized as a 2-dimension Boolean array. The scale of the array is determined by the size of the participant list. Each element in the matrix is set to FALSE by default. The tasks in the task list are then checked one by one. For each task, elements indexed by the IDs of the initiating participant and participants are selected and their value are set to TRUE if not set before. In the end of the algorithm, trust graph 150 in matrix format 152 is derived and made available for forming trust federation between participant domains.

```
Input: Participant P[ ], Task T[ ];
trustMatrix[|P|, |P|];
for each matrix element tm[i,j] ∈ trustMatrix[|p|][|p|] {
    tm[i,j] = FALSE;
}
for each task ∈ T {
    for each participant pr ∈ task.participants {
        if tm[task.initiatingParticipant.id, pr.id] == FALSE
            tm[task.initiatingParticipant.id, pr.id] = TRUE;
    }
}
```

Returning to process 100 depicted in FIG. 4, process 100 includes producing (130) data representing trust relationships required in order to perform the business process. An example of such production is producing a matrix according to the disclosure. In particular, at 131, trust relationships are defined to include that all recipient participants trust a communication from initiating recipients, on a task by task basis.

Business entities and description of their services need to be available for trust federation to be effectively deployed in participant domains. The business entity data and service descriptions can be organized online by a public registry, such as a Universal Description Discovery Integration (UDDI) service repository. UDDI provides an open registry standard which enables businesses to publish their service listings, and consumers to discover service offers. UDDI defines a business key as a unique identifier for a business entity and metadata for describing business entities and their service offers. Identifiers, keys, function descriptions, access points, and bindings of the services are listed to provide technical accessibility.

Example pseudocode for generating trust policy rules from a trust graph derived from a choreography process model is as follows:

```
Input:Participant P[ ], trustMatrix[|P|, |P|];
for each participant ∈ P {
    i,j=0;
    for each element tm ∈ trustMatrix[1..|P|, participant.id] {
        if tm[i, participant.id] == TRUE {
            rules[participant.id, j] ="Request from P[i].id is trustable."
            j = j + 1;
        }
        i = i + 1;
    }
}
```

The above algorithm provides for creation of trust policies for each participant's domain, to extract trust relationships which are relevant to a specific participant and these policies can be represented by generated abstract trust rules. After trust relationships and concrete business and technical information of the participants become available, vendor specific trust policies can be created and enforced in participant domains through a policy deployment infrastructure. Those trust policies specify how identities and attributes are shared between participants in terms of derived trust relationships.

Generated rules can be complemented with specific information from the UDDI registry (in example process 100, at 140, UDDI registry is accessed for business entity and service descriptions). This UDDI information can be used in process 100 for producing (145) deployable policies in the participant domain. For example, an abstract rule may be that Participant SeatEngineering 52 trusts Requests from Participant SeatMaker 51. Such abstract rule can be materialized as:
Request from (source="http://services.seatMaker.com:8080/soap/send" with serviceKey="c5921160-3e16-11d5-98bf-002035229c64") is trustable.

In some security frameworks such as WS-Security and WS-Federation, trust policies can be expressed in the format of WS-Policy and deployed to Security Token Services (STS) of participant domains. Trust policies can be also presented as configurations of trust federation technologies such as open SAML or WS-Federation tokens for cross-domain single sign-on. Available technologies help implement authentication in cross-enterprise business processes and these technologies are not exhaustively described herein, to avoid obscuring pertinent disclosures.

Derivation of trust federation from collaborative business processes is expected to contribute to building security and trust for emerging computing paradigms such as Internet of Services and cloud computing. Internet of Services creates a comprehensive service ecosystem on the Internet, which consists of multiple parties such as service marketplaces, service providers, and service consumers. Before any business collaboration can be executed, proper trust relationships must be established between participants and necessary security configurations must be in place. To model business collaboration as choreography process models and derive trust federation policies can effectively help holistic security design and implementations for collaborative applications on the Internet of Services.

Embodiments of the disclosed systems and processes can also help applications hosted on clouds where computing resources are provided as services in a pay-per-use manner to reduce Total Cost of Ownership (TCO). Composition of services to support business collaboration on clouds is exact the use case where the trust federation derivation approach can be applied.

Implementations of the disclosure provide that necessary trust requirements can be captured and corresponding policies can be derived. The derivation can be conducted either at design time for security policy authoring, or at runtime to support dynamic configuration. In addition, with support of a service registry, trust federation policies can be materialized into deployable security policies and made ready to be enforced in the security domain of the participating organizations. Some advantages of trust federation derivation from BPMN choreography models are summarized below.

Business process modeling languages, such as BPMN, are designed to address business functions instead of technical implementation of security or trust. Computing trust relationships from choreography process models can effectively help system designers capture trust requirements of business collaborations. Trust federation can be derived on demand, which enable trust configuration to adapted just-in-time for reflecting dynamic changes of business demands.

Derivation of trust federation from business process models can reduce overhead of security management and reduce or eliminate human errors. By use of a service registry and policy deployment infrastructure, derivation of trust federation automates trust management of service-oriented applications and can be applied in the next generation of computing environments such as Internet of Services and cloud computing.

Figure 7:
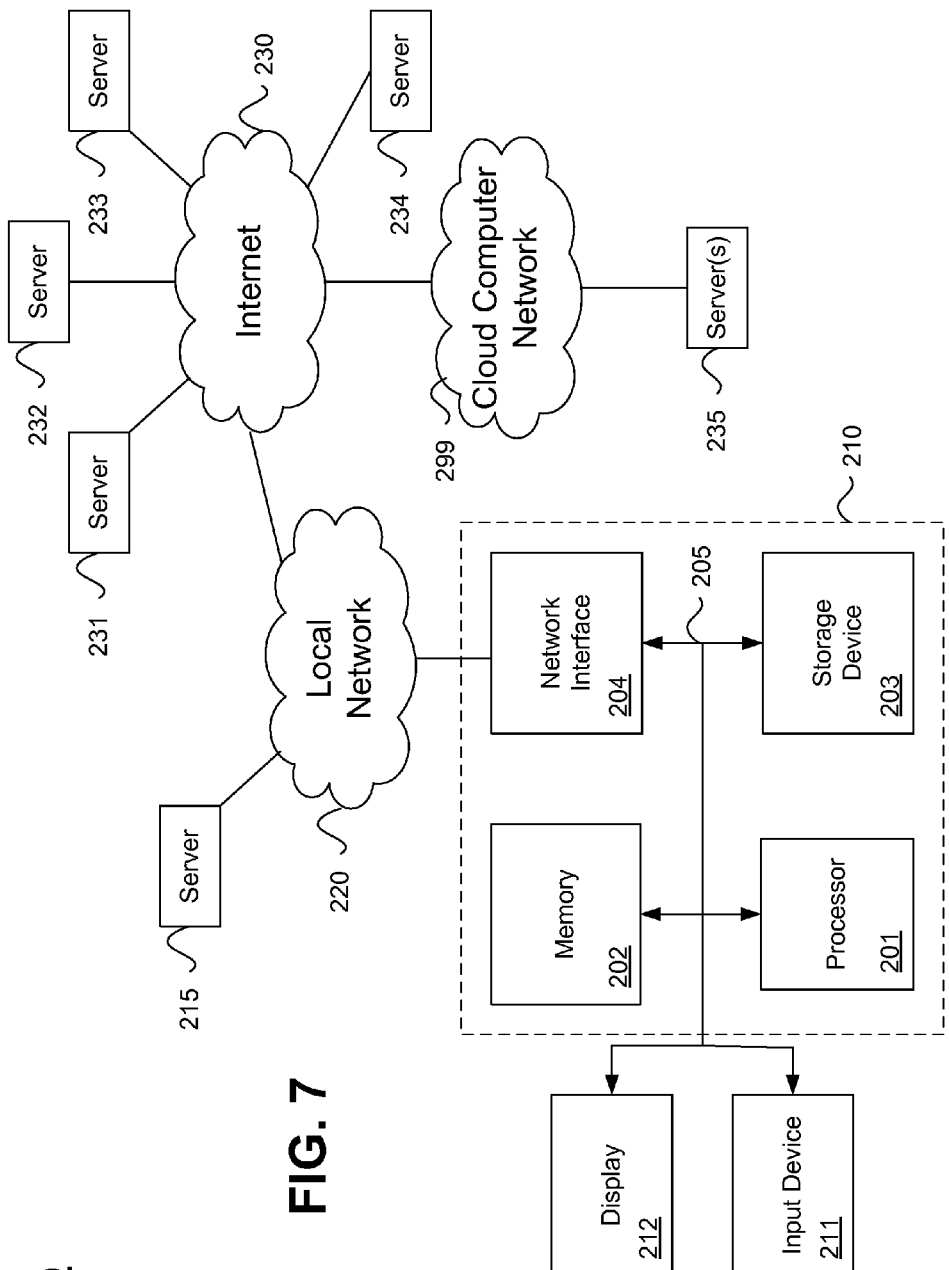
FIG. 7 depicts an example network oriented situation in which components depicted in FIG. 1 and portions of the process depicted in FIG. 4 can be implemented.

FIG. 7 depicts hardware of a machine configured to perform processes according to this disclosure. An example computer system 210 is illustrated in FIG. 7. Computer system 210 includes a bus 205 or other communication mechanism for communicating information, and a processor 201 coupled with bus 205 for processing information. Computer system 210 also includes a memory 202 coupled to bus 205 for storing information and instructions to be executed by processor 201, including information and instructions for performing the techniques described above, for example. This memory may also be used for storing variables or other intermediate information during execution of instructions to be executed by processor 201. Possible implementations of this memory may be, but are not limited to, random access memory (RAM), read only memory (ROM), or both. A storage device 203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 203 may include source code, binary code, or software files for performing the techniques above, for example. Storage device and memory are both examples of computer readable mediums.

Computer system 210 may be coupled via bus 205 to a display 212, such as a cathode ray tube (CRT) or liquid crystal display (LCD), for displaying information to a computer user. An input device 211 such as a keyboard and/or mouse is coupled to bus 205 for communicating information and command selections from the user to processor 201. The combination of these components allows the user to communicate with the system. In some systems, bus 205 may be divided into multiple specialized buses.

Computer system 210 also includes a network interface 204 coupled with bus 205. Network interface 204 may provide two-way data communication between computer system 210 and the local network 220. The network interface 204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 204 sends and receives electrical, electromagnetic, or optical signals that carry digital data streams representing various types of information.

Computer system 210 can send and receive information, including messages or other interface actions, through the network interface 204 across a local network 220, an Intranet, or the Internet 230. For a local network, computer system 210 may communicate with a plurality of other computer machines, such as server 215 one or more of which may run backend system software such as an ERP software system, CRM, or database for example. Accordingly, computer system 210 and server computer systems represented by server 215 may form a local network, which may be programmed with processes described herein. In the Internet example, software components or services executing on computer system in the local network may communicate with computer programs on a cloud network 299 across the Internet. Communications with program on the Internet may include communication with programs residing on multiple different computer systems 210 or servers 231-235 across the network. The processes described above may be implemented for communication with programs implemented on one or more servers, for example. A server 235 on cloud 299, for example, may transmit messages through Internet 230, local network 220, and network interface 204 to a component on computer system 210. The software components and processes described above may be implemented on any computer system and send and/or receive information between networks as set forth above, for example.

The apparatuses, methods, and techniques described below may be implemented as computer programs (software) executing on one or more computers. The computer program may further be stored on a computer readable medium, such as a tangible computer readable medium. The computer readable medium may include instructions for performing the processes described below. In the description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein. Based on the above disclosure and the following claims, other arrangements, embodiments, implementations and equivalents will be evident to those skilled in the art and may be employed without departing from the scope defined by the claims.

APPENDIX

XML for Choreography Model of FIG. 3

```
<?xml version="1.0" encoding="UTF-8"?>
<bpmn:definitions xmlns:bpmn=http://www.omg.org/spec/BPMN/20100524/MODEL
targetNamespace="carseatdesign" xmlns:csd="carseatdesign">
<participant id="CarMaker" name="CarMaker" />
<participant id="SeatMaker" name="SeatMaker" />
<participant id="SpecEngineering" name="SpecEngineering" />
<participant id="EcoConsult" name="EcoConsult" />
<bpmn:choreograhy id="chor_carseat-design">
<startEvent id="StartProcess"/>
<sequenceFlow sourceRef="StartProcess" targetRef="SendReqs"/>
<choreograhyTask id="SendReqs" name="SendReqs"> participantRef="CarMaker"
participantRef="SeatMaker" initiatingParticipantRef="CarMaker" </choreographyTask>
<sequenceFlow sourceRef="SendReqs" targetRef="SendDesign"/>
<choreograhyTask id="SendDesign" name="SendDesign"> participantRef="SeatMaker"
participantRef="SpecEngineering" initiatingParticipantRef="SeatMaker" </choreographyTask>
<sequenceFlow sourceRef="SendDesign" targetRef="CalculateEcoValue"/>
<choreograhyTask id="CalculateEcoValue" name="CalculateEcoValue"> participantRef="EcoConsult"
participantRef="SpecEngineering" initiatingParticipantRef="SpecEngineering" </choreographyTask>
<sequenceFlow sourceRef="CalculateEcoValue" targetRef="EcoValueDecision"/> <exclusiveGateway
id="EcoValueDecision" gatewayDirection="diverging"/>
<sequenceFlow sourceRef="EcoValueDecision" targetRef="DisapproveSpec">
<conditionExpression>EcoValue not OK?</conditionExpression> </sequenceFlow>
<sequenceFlow sourceRef="EcoValueDecision" targetRef="ApproveSpec">
<conditionExpression>EcoValue OK?</conditionExpression>
</sequenceFlow>
<choreograhyTask id="DisapproveSpec" name="DisapproveSpec"> participantRef="CarMaker"
participantRef="SeatMaker" initiatingParticipantRef="CarMaker"
</choreographyTask>
<sequenceFlow sourceRef="DisapproveSpec" targetRef="DisapproveDesign"/>
<choreograhyTask id="DisapproveDesign" name="DisapproveDesign"> participantRef="SeatMaker"
participantRef="SpecEngineering" initiatingParticipantRef="SeatMaker"
</choreographyTask>
<sequenceFlow sourceRef="DisapproveDesign" targetRef="SendDesign"/>
<choreograhyTask id='ApproveSpec' name='ApproveSpec'> participantRef='EcoConsult'
participantRef='SpecEngieeringeatMaker' initiatingParticipantRef='EcoConsultCarMaker'
</choreographyTask>
<sequenceFlow sourceRef='ApproveSpec' targetRef='ApproveDesign'/>
<choreograhyTask id='ApproveDesign' name='ApproveDesign'> participantRef='SpecEngineering'
participantRef='SeatMaker' initiatingParticipantRef='SpecEngineering'
</choreographyTask>
<sequenceFlow sourceRef='ApproveDesign' targetRef='DeliverDesign&Spec'/>
<choreograhyTask id='DeliverDesign&Spec' name='DeliverDesign&Spec'> participantRef='SeatMaker'
participantRef='CarMaker' initiatingParticipantRef='SeatMaker' </choreographyTask>
<sequenceFlow sourceRef='DeliverDesign&Spec' targetRef='EndProcess'/> <endEvent id='EndProcess'/>
</bpmn:choreography> </bpmn:definitions>
```

What is claimed is:

1. A machine implemented method comprising:
accessing data from a tangible machine readable medium representative of a model of a process, the model being in a format of a Business Process Modeling Notation (BPMN) choreography process that defines expected behavior among participating entities;
identifying, from the model of the process, a set of participating entities;
identifying a set of choreography tasks conducted between the set of participating entities; and
for at least one choreography task in the set of choreography tasks:
identifying an initiating participating entity and a corresponding participating entity for the choreography task;
generating data indicating a trust relationship between the initiating participating entity and the corresponding participating entity based on the choreography task;
storing data in a tangible computer readable medium indicating the trust relationship between the corresponding participating entity and the initiating participating entity; and
accessing the data indicating the trust relationship to establish a security framework across a first enterprise domain of the initiating participating entity and a second enterprise domain of the corresponding participating entity.

2. The machine implemented method of claim 1, wherein storing the data indicating the trust relationship between the corresponding participating entity and the initiating participating entity comprises storing an entry in a matrix of binary values, the matrix having a row entry and a column entry for at least a portion of the set of participating entities in the process.

3. The machine implemented method of claim 1, further comprising initializing the binary values of the matrix to indicate absence of a trust relationship.

4. The machine implemented method of claim 1, wherein identifying the set of choreography tasks comprises identifying a choreography task declaration in an XML formatted file representing the model of the process, and wherein identifying the set of participating entities comprises identifying a plurality of instances of participant reference tags.

5. The machine implemented method of claim 1, wherein the model of the process is represented by an XML formatted file, and identifying the set of participating entities comprises parsing the XML formatted file to extract participant identifiers from the XML formatted file.

6. The machine implemented method of claim 1, wherein the model of the process is represented by an XML formatted file, and identifying the set of tasks comprises parsing the XML formatted file to extract choreography task identifiers from the XML formatted file.

7. The machine implemented method of claim 1, further comprising making a respective instance of a participating entity class for some of the set of participating entities, and making a respective instance of a choreography task class for the choreography task.

8. A system comprising:
a computation system comprising a processor; and
a tangible memory, the processor coupled to read from and write to the tangible memory, wherein the tangible memory stores instructions, that when executed by the processor configure the processor to:
    access data from a tangible machine readable medium representative of a model of a process, the model being in a format of a Business Process Modeling Notation (BPMN) choreography process that defines expected behavior among participating entities;
    identify, from the model of the process, a set of participating entities;
    identify a set of choreography tasks conducted between the set of participating entities; and
    for at least one choreography task in the set of choreography tasks:
        identify an initiating participating entity and a corresponding participating entity for the choreography task,
        generate data indicating a trust relationship between the initiating participating entity and the corresponding participating entity based on the choreography task;
        store data in a tangible computer readable medium indicating the trust relationship between the corresponding participating entity and the initiating participating entity; and
        access the data indicating the trust relationship to establish a security framework across a first enterprise domain of the initiating participating entity and a second enterprise domain of the corresponding participating entity.

9. The system of claim 8, wherein the instructions further configure the processor to store a matrix of binary values, the matrix having a row entry and a column entry for at least a portion of the set of participating entities in the process.

10. The system of claim 9, wherein the instructions further configure the processor to initialize the binary values of the matrix to indicate absence of a trust relationship.

11. The system of claim 8, wherein the instructions further configure the processor to identify a choreography task declaration in an XML formatted file representing the model of the process, and identify each instance of a participant reference tag.

12. The system of claim 8, wherein the model of the process is represented by an XML formatted file, and the instructions further configure the processor to identify the set of participating entities by parsing the XML formatted file to extract participant identifiers from the XML formatted file.

13. The system of claim 8, wherein the model of the process is represented by an XML formatted file, and the instructions further configure the processor to identify the set of tasks by parsing the XML formatted file to extract choreography task identifiers from the XML formatted file.

14. The system of claim 8, wherein the instructions further configure the processor to make a respective instance of a participating entity class for some of the participating entities, and make a respective instance of a choreography task class for each choreography task.

15. A tangible machine readable memory storing instructions that when executed by a processor configure the processor for:
    accessing data from a tangible machine readable medium representative of a model of a process, the model being in a format of a Business Process Modeling Notation (BPMN) choreography process that defines expected behavior among participating entities;
    identifying, from the model of the process, a set of participating entities;
    identifying a set of choreography tasks conducted between the set of participating entities; and
    for at least one choreography task in the set of choreography tasks:
        identifying an initiating participating entity and a corresponding participating entity for the choreography task;
        generating data indicating a trust relationship between the initiating participating entity and the corresponding participating entity based on the choreography task;
        storing data in a tangible computer readable medium indicating the trust relationship between the corresponding participating entity and the initiating participating entity; and
        accessing the data indicating the trust relationship to establish a security framework across a first enterprise domain of the initiating participating entity and a second enterprise domain of the corresponding participating entity.

16. The tangible machine readable memory of claim 15, wherein storing the data indicating the trust relationship between the corresponding participating entity and the initiating participating entity comprises storing an entry in a matrix of binary values, the matrix having a row entry and a column entry for at least a portion of the set of participating entities in the process, the binary values indicative of a trust relationship or absence of a trust relationship.

17. The tangible machine readable memory of claim 16, wherein the instructions further configure the processor for initializing the binary values of the matrix to indicate absence of a trust relationship.

18. The tangible machine readable memory of claim 15, wherein identifying the set of choreography tasks comprises identifying a choreography task declaration in an XML formatted file representing the model of the process, and wherein identifying the set of participating entities comprises identifying a plurality of instances of a participant reference tags.

19. The tangible machine readable memory of claim 15, wherein the model of the process is represented by an XML formatted file, and identifying the set of participating entities comprises parsing the XML formatted file to extract participant identifiers from the XML formatted file.

20. The tangible machine readable memory of claim 15, wherein the model of the process is represented by an XML formatted file, and identifying the set of tasks comprises parsing the XML formatted file to extract choreography task identifiers from the XML formatted file.

* * * * *